April 13, 1943. F. G. PARNELL 2,316,450
BRAKE FOR VEHICLES
Filed Oct. 3, 1941 2 Sheets-Sheet 1

Inventor
Frank Gordon Parnell
attorney
M. W. McConkey

April 13, 1943.　　　F. G. PARNELL　　　2,316,450
BRAKE FOR VEHICLES
Filed Oct. 3, 1941　　　2 Sheets-Sheet 2

Inventor
Frank Gordon Parnell
attorney
M. W. McConkey

UNITED STATES PATENT OFFICE 2,316,450

BRAKE FOR VEHICLES

Frank Gordon Parnell, Leamington Spa, England, assignor to Automotive Products Company Limited, Leamington Spa, England Application October 3, 1941, Serial No. 413,545
In Great Britain October 28, 1940

7 Claims. (Cl. 188—106)

This invention relates to brakes for vehicles, and of the kind comprising a pair of arcuate brake shoes each mounted to turn about a fulcrum at one end and to receive an outward thrust from a spreading means at the other end to apply it to a surrounding cylindrical drum surface, the fulcrumed ends of the shoe being adjacent to each other, and a common spreading means in the form of a fluid pressure cylinder unit being provided between the other pair of shoe ends, so that one shoe acts as a 'leading' shoe, and the other as a 'trailing' shoe.

In brakes of this kind, it is well-known to provide a second spreading means acting on the shoes, which are thus operable either by the fluid pressure transmission to provide a service brake for retarding the progress of the vehicle, or by a mechanical linkage to provide a parking brake for holding it stationary, the service brake being released automatically as soon as the driver ceases to apply braking effort, whilst the parking brake remains in action until manually released. It is customary to provide some means of adjusting the brake shoes to compensate for wear of the linings, and it is frequently necessary to provide an independent adjustment for the mechanical parking brake linkage, since the shoes move relatively to the linkage during adjustment.

The object of the present invention is to provide a brake of the kind hereinbefore referred to, in which the adjustment of the shoes to compensate for lining wear causes substantially no variation of the position of the shoes relative to the parking brake linkage so that no subsidiary adjustment of such linkage is necessary.

According to the invention, the fulcra of the two shoes are movable relatively to each other to adjust the shoes and compensate for lining wear, and a parking brake spreading means acts between the shoes at or near the ends thereof upon which the fluid pressure wheel cylinder unit acts, whereby the relative position of the points of connection of the said spreading means to the two shoes is substantially unaltered by the shoes adjustment.

The fluid pressure wheel cylinder preferably forms a rigid spacer for the shoe ends when shortened to its minimum length, and locates the shoes in their 'off' position. The parking brake spreading means may act between elements of the fluid pressure wheel cylinder unit, or may comprise a lever pivoted to one shoe adjacent its end engaged by the fluid pressure wheel cylinder, a strut between the lever and the other shoe, and means for applying a force to the lever to move the shoes apart. The fulcrum of one shoe may be fixed relatively to the brake support, the fulcrum of the other shoe being adjustable relatively thereto, the fluid pressure wheel cylinder being capable of sliding movement parallel to its axis on the brake support so that both shoes may be adjusted by the movement of one fulcrum.

The wheel cylinder may be closed at one end and may engage one of the shoes at its closed end, a piston slidable in the wheel cylinder engaging the other shoe. The shoes may fulcrum on a fulcrum member comprising a body fixed to the brake support, a tappet adjustable with relation to said body, and convex arcuate surfaces on said body and tappet engaged respectively by corresponding concave surfaces on the ends of the shoes. The convex arcuate surfaces may be formed at the bases of grooves in the body and tappet respectively, and the tappet may be adjusted relatively to the body by rotation of an intermediate member screwing on the tappet and taking its abutment on the body.

The invention is hereinafter described with reference to the accompanying drawings, in which.

Figure 1:
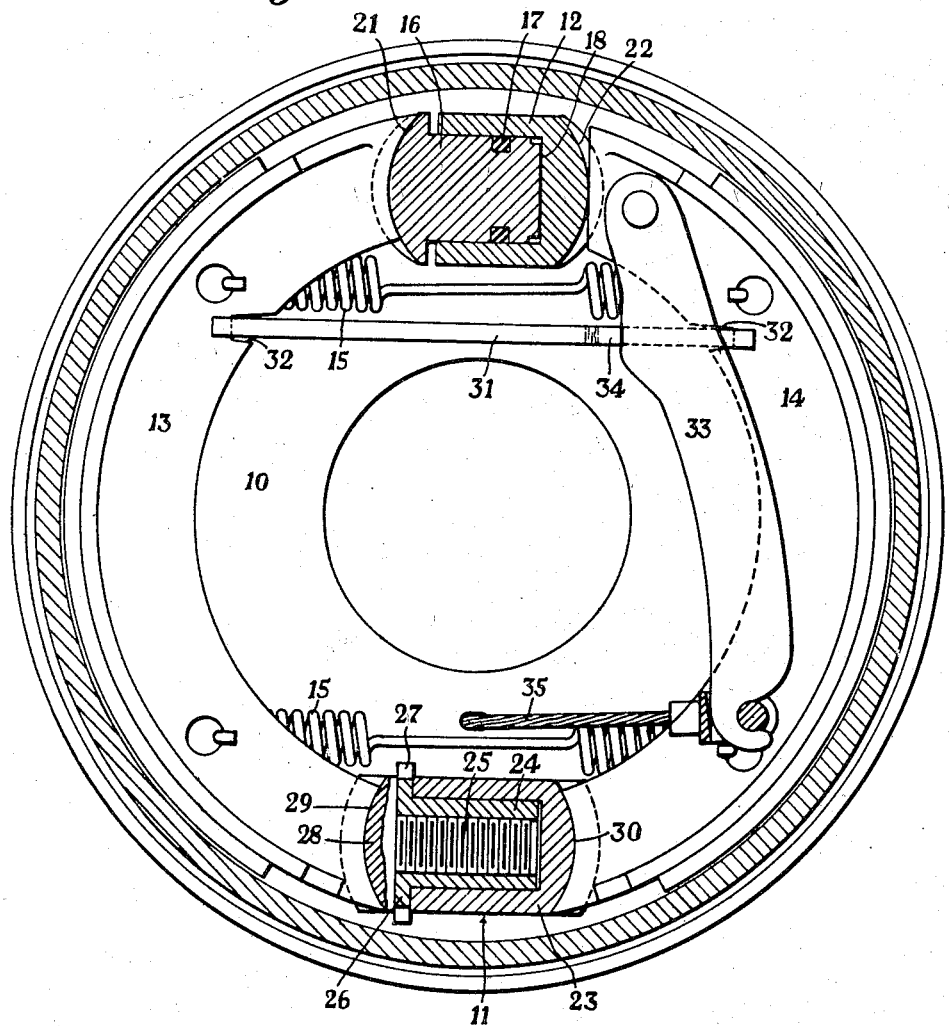
Figure 1 is an elevation of one form of brake assembly according to the invention.

Referring to Figure 1, the brake comprises a circular backplate 10 on which a fulcrum member 11 is rigidly mounted near to one end of a diameter, and a fluid pressure wheel cylinder 12 is mounted at the opposite end of the same diameter, the two shoes 13 and 14 being each mounted between one side of the fulcrum member 11 and one side of the wheel cylinder 12, and being held in position by two pull-off springs 15—15 extending between them. The wheel cylinder 12 is closed at one end, and is formed with a spigot (not shown) passing through a slot in the backplate to receive a nut or other securing device. The cylinder 12 is thus secured to the backplate 10, but the nut is not tightened on to the backplate, so the cylinder is capable of sliding on the backplate. A piston 16 fitting in the cylinder 12 has a sealing ring 17 arranged in a groove formed a short distance from its inner end 18, and the said end 18, by abutting against the closed end of the cylinder 12 positively limits the movement of the piston into the cylinder.

The closed end of the cylinder engages the shoe 14, and the outer end of the piston engages the shoe 13, the ends of the piston and cylinder being of convex arcuate form, and being grooved diametrally as at 21 and 22 to receive the ends of the shoe webs and locate the latter against lateral movement. The shoe 14 has a straight end engaging in the groove 22 in the cylinder end, and the shoe 13 has a concave end corresponding to the form of the base of the groove 21 in the piston. The cylinder 12 is located against turning about its centre by the engagement of the concave shoe end with the corresponding convex base of the groove in the piston. The fulcrum member 11, which is rigidly secured to the backplate, comprises a cylindrical body 23 closed at one end and receiving within it a hollow sleeve 24 threaded internally to engage with a screw threaded tappet 25. The sleeve 24 has an annular flange 26 at its outer end which bears on the open end of the body 23 and is formed with teeth or projections 27 for engagement by a tool for rotating it in the body. The head 28 of the tappet, and the closed end of the body are of part-spherical form, and are formed with diametral grooves 29 and 30 with convex arcuate bases, the co-operating shoe ends being of corresponding concave shape, so that they fit snugly on the convex bases of the grooves 29 and 30 and fulcrum about the centres of curvature of those surfaces, which are approximately at the centre of the fulcrum member.

The handbrake linkage comprises a strut 31 extending between the two shoes 13 and 14, near the wheel cylinder 12, and having slotted ends engaging slots 32 in the shoe webs so that the strut is located both in the plane of the shoes and transversely thereto, and a lever 33 pivoted on the shoe 14 close to its end adjacent the wheel cylinder 12, and engaging a lug 34 on the strut 31. A cable 35 is connected to the other end of the lever and to a hand lever (not shown) by which the linkage is operated. A pull applied to the cable 35 causes the lever 33 to turn about its point of engagement with the strut 31 to force outwardly the shoe 14 to which the lever is pivoted, at the same time applying a thrust through the strut to the other shoe 13, and thus bringing both shoes into engagement with the drum.

The fluid pressure wheel cylinder 12 is connected to a master cylinder, the piston in which is operable by the driver of the vehicle to transmit pressure through a column of liquid to the wheel cylinder, thus causing the piston to move outwardly. As the cylinder 12 is free to move, the pressure moves it in one direction and the piston 16 in the other, to apply both shoes 13 and 14 to the drum.

As is well-known, the leading shoe of a brake of the kind herein described is much more effective than the trailing shoe, due to its self-applying tendency, and the brake drum tends to be distorted, when the brake is applied, to a somewhat elliptical form, with its major axis through the drum centre and the approximate centres of the shoes, and its minor axis spaced slightly from the true drum centre towards the leading shoe. The wheel cylinder is so mounted that its closed end acts on the shoe 14 which, during normal forward movement of the vehicle in its normal forward direction of motion, is the trailing shoe, and it will be seen that, due to the drum distortion, the end of the trailing shoe 14 engaging the wheel cylinder will have a very small outward movement, if any, since the drum will move inwards at the part engaged by that portion of the shoe. When the brake is released, there is no force tending to move the cylinder 12 relatively to the backplate, and it therefore remains where it is, the piston moving into it to release the leading shoe from the drum, and the recovery of the drum to its normal shape causing the said drum to move out of contact with the trailing shoe. When the brakes are applied whilst the vehicle is moving in the reverse direction, the shoe 14 engaging the cylinder becomes the leading shoe, and it will not be cleared from the drum by the recovery of the latter, but as the cylinder is free to float even if the shoe remains in contact with the drum it is under no pressure and will produce no appreciable degree of braking. The first subsequent application of the brakes with the vehicle moving forwardly will of course centre the shoes as described above.

The fulcrum member 11 is so disposed that the tappet 25 forms the fulcrum of the shoe 13 which is normally the leading shoe of the brake, and to adjust the shoes the sleeve 24 in the body of the fulcrum member is rotated to move the tappet 25 outwardly, thus moving the shoe 13 into contact with the drum and, if the movement is continued, transmitting the movement through the wheel cylinder 12 to the other shoe 14, so bringing both shoes into contact with the drum. The tappet 25 is then slacked back slightly by turning the sleeve in the reverse direction and the brakes are applied with the vehicle moving forwardly. The drum distortion referred to above moves the trailing shoe inwardly and divides the clearance obtained by slacking back the tappet between the two shoes. As the spacing of the ends of the shoes which engage the wheel cylinder unit is unaltered by this adjustment, the only change in their relative positions is a slight angular movement due to the increased spacing of their other ends, and as the parking brake linkage is connected to the shoes near the wheel cylinder, this relative movement is so small as to have no substantial effect on that linkage, which thus does not need to be itself adjusted. As the fulcrum of the leading shoe is substantially at the centre of the fulcrum member, its straight line of movement during adjustment coincides substantially with the circumference of a circle struck from the drum centre and passing through the fulcrum point, with the result that the radial distance of the fulcrum from the drum centre varies only very slightly during the life of the lining and the brake characteristics remain substantially constant. The arrangement may be such that the fulcrum point of the shoe lies on the circle struck from the drum centre when the brake linings are half worn and moves along a line tangential to the circle at that point, in which case the variation of the radial distance is a minimum.

Figure 2:
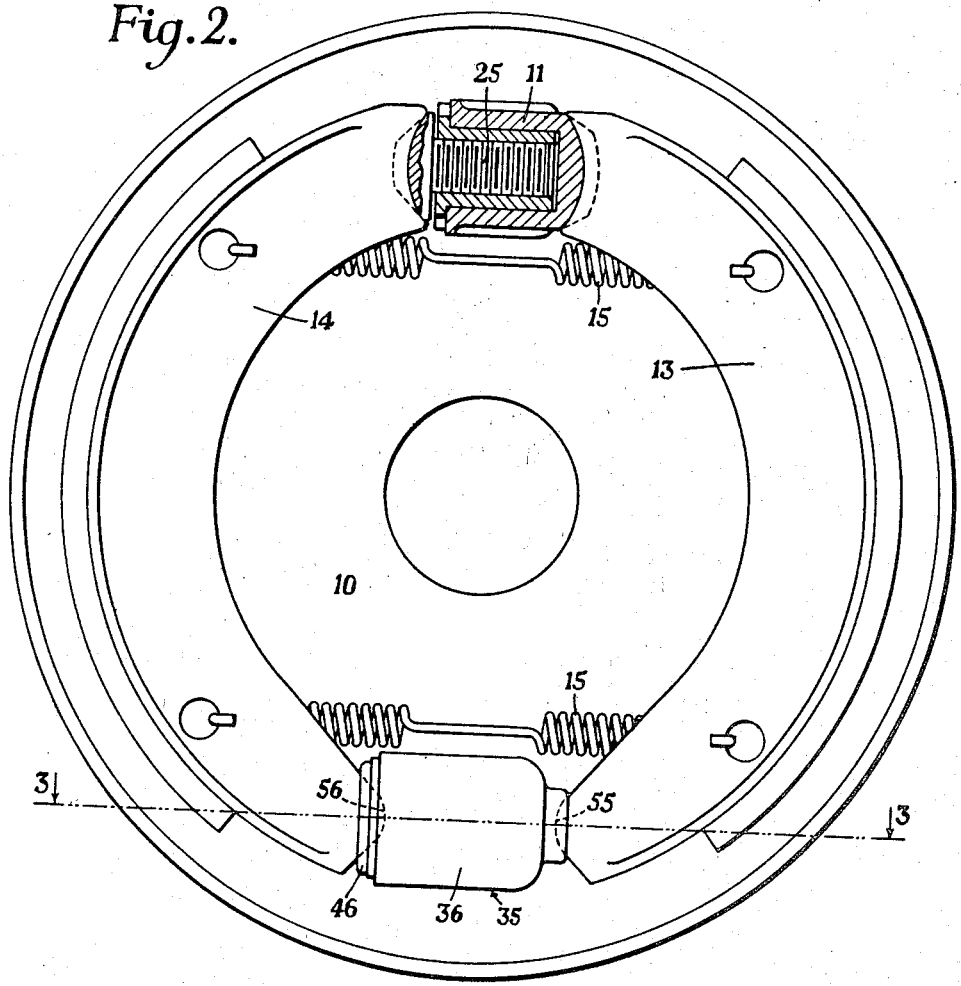
Figure 2 is an elevation of another form of brake assembly according to the invention.
Figure 3:
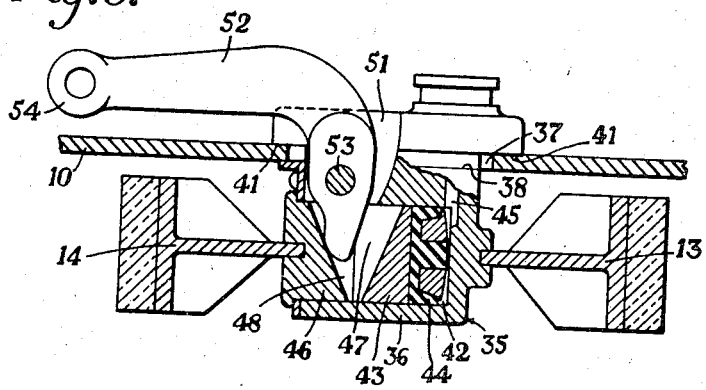
Figure 3 is a section on the line 3—3 of Figure 2.

Figures 2 and 3 show a modified form of brake assembly incorporating the invention, in which the parking brake spreading means is combined with the fluid pressure wheel cylinder.

As in the arrangement shown in Figure 1, the shoes 13 and 14 are fulcrumed one on each side of a fulcrum member 11. One shoe is fulcrumed on the body of the member 11 and an adjustable tappet 25 forms the fulcrum of the other shoe so that the fulcrum of that shoe can be adjusted relatively to the fulcrum of the first. A combined spreading device 35 is mounted between the ends of the shoes 13 and 14 remote from the fulcrum member 11, and two springs 15—15 extending between the shoes 13 and 14 hold the shoes in engagement with the fulcrum member and the wheel cylinder and return them to their initial position after a braking operation. The spreading device is shown in section in Figure 3. It comprises a body 36 slidable in a slot 37 in the backplate 10, the body having shoulders 38 along each side which engage with the inner surface of the backplate, and projecting end portions 41 which engage the outer surface of the backplate, so that the body is retained in the slot 37 but is free to slide therein. The body 36 is fitted in position by passing one end projection through the slot, sliding the body to the extreme end of the slot at the end through which the projection has been passed, passing the other end projection through and then centralising the body in the slot. The body 36 is formed with a cylindrical recess 42 closed at one end and forming a fluid pressure wheel cylinder, and in this recess is slidably fitted a piston 43 on which is mounted a packing cup 44. Fluid is fed into the cylindrical recess between the closed end and the piston 43 through an inlet 45. A plunger 46, also slidable in the recess 42, abuts against the outer end of the piston 43, the piston and plunger being formed with diametral slots 47 and 48 respectively extending across their abutting faces. A slot 51 in the body 36 extends from the recess 42 to the face of the body lying outside the backplate 12, and in this slot is mounted a lever 52 pivoting on a pin 53 extending across the slot. One end of the lever extends into the slots 47 and 48 in the piston and plunger, the other end being cranked to lie parallel to the backplate, and having an eye 54 at its extremity in order that it may be coupled to a cable or pull-rod of the parking brake linkage. The shoes 13 and 14 are formed with arcuate edges 55 and 56 on their webs which enter correspondingly shaped slots in the closed end of the body 36 and in the plunger 46 respectively.

Fluid pressure entering the recess 42 moves the piston 43 outwardly, thus applying a thrust, through the plunger 46 to the shoe 14, whilst the reaction on the closed end of the recess applies an equal and opposite thrust to the shoe 13. The movement of the piston 43 relatively to the body 36 does not disturb the lever 52, the slot 47 in the piston being deep enough to allow the movement of the piston to take place without the lever touching the bottom of the slot.

A pull applied to the outer end of the lever 52 by the parking brake linkage causes it to move the plunger 46 outwardly away from the piston 43, thus applying a similar spreading thrust to the shoes to that applied by the fluid pressure acting on the piston 43.

The adjustment of this brake is carried out in exactly the same manner as the adjustment of the brake shown in Figure 1, the tappet 25 being moved outwardly by rotation of the sleeve 24. As the parking brake acts actually between the ends of the shoes which engage the fluid pressure wheel cylinder, the adjustment has no effect at all upon the parking brake linkage.

It will be understood that these two forms of the invention are described only by way of example and that various modifications may be made in the construction and arrangement of the brake. The parking brake linkage may be modified in many ways and the adjustment of the shoes may be effected by means other than those described.

What I claim is:

1. A brake comprising a brake support, two shoes mounted on the support having fulcra which are movable relatively to each other to adjust the shoes and compensate for lining wear, the fulcrum of one shoe being fixed relatively to the brake support and the fulcrum of the other shoe being adjustable relative thereto, a fluid pressure wheel cylinder acting between the shoes opposite their fulcra and capable of sliding movement parallel to its axis on the brake support so that both shoes may be adjusted by the movement of one fulcrum, and parking brake spreading means acting between the shoes at or near the ends thereof upon which the fluid pressure wheel cylinder acts whereby the relative position of the points of connection of the parking brake spreading means to the two shoes is substantially unaltered by the shoe adjustment.

2. A brake comprising a brake support, two shoes mounted on the support, having fulcra which are movable relatively to each other to adjust the shoes and compensate for lining wear, the fulcrum of one shoe being fixed relatively to the brake support and the fulcrum of the other shoe being adjustable relative thereto, and a fluid pressure wheel cylinder acting between the shoes opposite their fulcra and capable of sliding movement parallel to its axis on the brake support so that both shoes may be adjusted by the movement of one fulcrum.

3. A brake comprising a brake support, two shoes mounted on the support having fulcra which are movable relatively to each other to adjust the shoes and compensate for lining wear, the fulcrum on one shoe being fixed relatively to the brake support and the fulcrum of the other shoe being adjustable relative thereto, a fluid pressure wheel cylinder unit acting between the shoes opposite their fulcra and capable of sliding movement parallel to its axis on the brake support so that both shoes may be adjusted by the movement of one fulcrum, and parking brake spreading means acting between the shoes at or near the ends thereof upon which the fluid pressure wheel cylinder acts whereby the relative position of the points of connection of the spreading means to the two shoes is substantially unaltered by the shoe adjustment, said wheel cylinder unit comprising a cylinder closed at one end and engaging one of the shoes at its closed end and a piston slidable in the cylinder and engaging the other shoe.

4. A brake comprising a brake support, two shoes mounted on the support having fulcra which are movable relatively to each other to adjust the shoes and compensate for lining wear, the fulcrum on one shoe being fixed relatively to the brake support and the fulcrum of the other shoe being adjustable relative thereto, and a fluid pressure wheel cylinder unit acting between the shoes opposite their fulcra and capable of sliding movement parallel to its axis on the brake support so that both shoes may be adjusted by the movement of one fulcrum, the aforesaid fulcra for the shoes comprising a body fixed to the brake support, a tappet adjustable with relation to said body, and convex arcuate surfaces on said body and tappet engaged respectively by corresponding concave surfaces on the ends of the shoes.

5. A brake comprising a brake support, two shoes mounted on the support having fulcra which are movable relatively to each other to adjust the shoes and compensate for lining wear, the fulcrum on one shoe being fixed relatively to the brake support and the fulcrum of the other shoe being adjustable relative thereto, and a fluid pressure wheel cylinder unit acting between the shoes opposite their fulcra and capable of sliding movement parallel to its axis on the brake support so that both shoes may be adjusted by the movement of one fulcrum, the aforesaid fulcra for the shoes comprising a body fixed to the brake support, a tappet adjustable with relation to said body, and convex arcuate surfaces on said body and tappet engaged respectively by corresponding concave surfaces on the ends of the shoes, said convex arcuate surfaces being formed at the bases of grooves in the body and tappet respectively.

6. A brake comprising a brake support, two shoes mounted on the support having fulcra which are movable relatively to each other to adjust the shoes and compensate for lining wear, the fulcrum on one shoe being fixed relatively to the brake support and the fulcrum of the other shoe being adjustable relative thereto, and a fluid pressure wheel cylinder unit acting between the shoes opposite their fulcra and capable of sliding movement parallel to its axis on the brake support so that both shoes may be adjusted by the movement of one fulcrum, the aforesaid fulcra for the shoes comprising a body fixed to the brake support, a tappet adjustable with relation to said body, convex arcuate surfaces on said body and tappet engaged respectively by corresponding concave surfaces on the ends of the shoes, and means for adjusting the tappet relatively to the body comprising a rotatable intermediate member screwing on the tappet and taking its abutment on the body.

7. A brake comprising a brake support, two shoes mounted on the support having fulcra which are movable relatively to each other to adjust the shoes and compensate for lining wear, the fulcrum on one shoe being fixed relatively to the brake support and the fulcrum of the other shoe being adjustable relative thereto, and a fluid pressure wheel cylinder unit acting between the shoes opposite their fulcra and capable of sliding movement parallel to its axis on the brake support so that both shoes may be adjusted by the movement of one fulcrum, the aforesaid fulcra for the shoes comprising a body fixed to the brake support, a tappet adjustable with relation to said body, convex arcuate surfaces on said body and tappet engaged respectively by corresponding concave surfaces on the ends of the shoes, the body of the fulcrum member comprising a sleeve closed at one end, a second sleeve rotatable on the first and having a shoulder bearing on the open end of the first sleeve, and a tappet threaded into said second sleeve.

FRANK GORDON PARNELL.